United States Patent
Schreck

[19]
[11] Patent Number: 6,005,736
[45] Date of Patent: Dec. 21, 1999

[54] METHOD AND MEANS FOR ACTIVE SHOCK PROTECTION IN A MAGNETIC DISK STORAGE DEVICE USING ELECTROSTATIC FORCES

[75] Inventor: Erhard Theodor Schreck, San Jose, Calif.

[73] Assignee: International Business Machines Corporation, Armonk, N.Y.

[21] Appl. No.: 08/955,394

[22] Filed: Oct. 21, 1997

[51] Int. Cl.$^6$ .................................................. G11B 21/02
[52] U.S. Cl. .................................................. 360/75; 360/60
[58] Field of Search .................................................. 360/75, 60, 69, 360/97.02, 137, 128; 369/44.32, 54

[56] References Cited

U.S. PATENT DOCUMENTS

| | | | |
|---|---|---|---|
| 4,684,913 | 8/1987 | Yaeger | 337/140 |
| 4,751,595 | 6/1988 | Kishi et al. | 360/105 |
| 4,862,298 | 8/1989 | Genheimer et al. | 360/75 X |
| 5,153,785 | 10/1992 | Muranushi et al. | 360/75 |
| 5,227,929 | 7/1993 | Comerford | 360/75 |
| 5,239,431 | 8/1993 | Day et al. | 360/98.08 |
| 5,546,374 | 8/1996 | Kuroda et al. | 369/126 |
| 5,663,847 | 9/1997 | Abramovitch | 360/75 X |
| 5,777,815 | 7/1998 | Kasiraj et al. | 360/75 |
| 5,903,409 | 5/1999 | Allen et al. | 360/75 |

FOREIGN PATENT DOCUMENTS

| | | |
|---|---|---|
| 52-78415 | 7/1977 | Japan . |
| 61-151839 | 7/1986 | Japan . |
| 62-184679 | 8/1987 | Japan . |
| 63-69075 | 8/1988 | Japan . |
| 64-13210 | 1/1989 | Japan . |
| 2-162584 | 6/1990 | Japan . |
| 3-105776 | 5/1991 | Japan . |
| 4-356764 | 12/1992 | Japan . |
| 6-243625 | 9/1994 | Japan . |
| 8-063922 | 3/1996 | Japan . |
| 8-096543 | 4/1996 | Japan . |
| 8-203053 | 8/1996 | Japan . |

OTHER PUBLICATIONS

C. Lin et al., "Electrostatically Loaded Slider Bearing", IBM Technical Disclosure Bulletin, vol. 12, Dec. 1969, p. 959.

*Primary Examiner*—Andrew L. Smiezek
*Attorney, Agent, or Firm*—G. Marlin Knight

[57] ABSTRACT

An arrangement and corresponding method for external shock protection for a storage device in which the movement of the slider in relation to the disk is prevented by applying an electrostatic attractive voltage between the slider and disk responsive to a shock event. The electrostatic attractive force generated acts to hold the slider down to reduce erratic movement and possible resulting damage. The shock protection system can be implemented in the operational mode of the drive when the slider is flying and/or when the slider is parked on the disk.

20 Claims, 3 Drawing Sheets

METHOD AND MEANS FOR ACTIVE SHOCK PROTECTION IN A MAGNETIC DISK STORAGE DEVICE USING ELECTROSTATIC FORCES

FIELD OF THE INVENTION

This invention relates to a minimizing shock-induced damage to disk drives, and more particularly to minimizing such shock damage in both operational and nonoperational states of the device.

DESCRIPTION OF RELATED ART

Aspects of Power Up/Power Down DASD Function and Geometry

A direct access storage device (DASD) or disk drive comprises at least one rotating disk covered with a magnetic coating which can store magnetic or electronic data and an apparatus for reading data from and writing data to that disk. This is implemented by a "spindle motor" to rotate the disk or disks, at least one "read/write head" to read and write data to and from the disk or disks, an "actuator" to position the read/write head or heads radially over the disk or disks either on a linear or rotary basis, and a "data channel" to transfer information between the read/write head or heads and a host computer.

The actuator has one or more "arms" extending like a comb toward the disk or disks. Attached to these arms is one end of one or more "load beams" or "suspensions". These flexible suspensions mechanically bias the sliders toward the disk surface with a force typically on the order of 3–4 grams. A wire or wires for the transmission of data to and from the read/write head assembly runs along each suspension or load beam. In this specification, the terms "slider", "transducer assembly", and "head assembly" are used synonymously.

In some disk drives, the data can be stored on both sides of each disk. The disk or disks are stacked horizontally over the spindle which is attached to the motor. In multiple disk units, the disks are parallel to one another with spaces between them. A read/write head assembly positioned over that side of the disk by its own actuator arm/load beam assembly services each disk surface. Data is organized on the disks in concentric circles called "tracks", which are divided into "sectors".

The actuator arm/load beam suspension combination moves each slider, including its read/write head assembly, either radially or by following an arcuate path across the disk at very high speed to the particular track or tracks to be accessed. Relatedly, the read/write heads ride on an "air bearing" in relative motion with respect to the disk. As areal recording density has increased, the "flying heights" between the heads and media are being reduced and are measured in terms of microinches or nanometers.

The disks are mechanically coupled to the spindle motor and are electrically grounded therethrough. Some substrate materials such as AlMg are electrically conductive, but it is also typical for one or more of the several thin film layers applied to the substrate to be conductive. The layers typically include at least one underlayer which is commonly Cr or a Cr alloy, a recording layer of magnetizable material and an overcoat for corrosion and wear resistance. Carbon and hydrogenated carbon are typical materials used for overcoats.

In the drives, the actuator arms are either fixed to or integral with the actuators so the arms and their attached load beam suspensions move all the sliders (read/write assemblies) simultaneously and parallel to one another as the actuator moves. As part of changing a disk drive from an operational to a nonoperational state, the slider and head, arms, and suspensions can be "parked" over the disks such that the slider body including the heads is opposite to and in contact relation with a disk surface or they may be withdrawn in such a way as to have no contact with the disk surface.

Shock, Flying Height, and Stiction

For purposes of this specification, "shock" is defined as an unintended acceleration imparted to the disk drive elements from external sources which vibrates the disk, actuator, and transducer/head assemblies.

The term "flying height" is the distance between the transducer and the surface of the disk recording medium arising as an aerodynamic consequence of disk rotation. That is, disk rotation creates an air bearing upon which the slider floats.

Lastly, the term "stiction" is used to denote the molecular level force of adhesion between a slider parked on a disk when the disk is not spinning. Stiction resists the torque from the spindle motor when spin up is attempted.

The design tradeoffs among these factors have become more exacerbated as the recording disk density has increased. The flying heights have decreased to 20–50 nanometers or microinches. The same can almost be said of the radial distance between adjacent tracks on the disk. Illustratively, it is well known in the art that texturing or slight deformation of a disk surface will reduce stiction between a slider parked on a disk, but such increase in surface roughness may adversely affect local disk magnetization. Also, because the flying heights are so small (20–50 nm or 1–2 microinches), the asperity due to texturing can also increase the likelihood of head and disk collision damage. Similarly, shock resistance is increased such as by mechanical preloading of the slider, but stiction is also increased upon a drive being powered on and torque applied to the disk.

Shock Components

Interest in disk drives operating in shock-prone environments has increased as the demand for portable, small form factor, high-density disk drives has increased. Similarly to stiction reduction, the very tight disk drive tolerances and portability of disk drives have increased the incidence of shock and have made managing it more difficult. In this regard, laptop computers and other portable instruments containing disk drives are subject to accidental shock when powered on or off. With the power off and the suspension/slider parked, shock damage of the disk and slider/head will be in place. With the power on, the disk drive disks and arm assemblies subject to shock become a set of self- and mutually-coupled collisions and resonances.

It is well appreciated that shock can have components in several directions. For instance, a shock component in the spindle direction can set a stack of disks flapping their outer diameters into one another, as well as throw the slider/head and suspension attending each disk into vibration. A shock component in the disk plane direction throws the slider off track. A resultant shock can twist the plane of the slider so that it vibrationally impacts the disk edge-on instead of its flat planar surface. Such an indentation may gouge the overcoat and the magnetic layers of the disk. This edge-on collision may lead to disk corrosion, cause loss of disk data and alter local magnetic effects.

Prior Art Disk Shock Management

In the prior art, shock has been managed according to its direction and the power and rotational relationship of the slider and the disk. In this regard, attention is directed to:

(1) Day et al., U.S. Pat. No. 5,239,431, "Head Lift Limiter for a Disk Drive", assigned to Hewlett Packard, issued Aug. 24, 1993.

(2) Allen et al., application Ser. No. 08/785,454, "Method and Means for Maintaining Data Integrity in Disk Drives Resulting from Shock-induced Contact Between Recording and Access Components During Nonoperational Periods", filed Jan. 17, 1997.

(3) T. Maruo, Japanese Unexamined Patent Application No. 06-243625, "Method for Contactless Holding of a Magnetic Head and Its Device", assigned to Sony Corporation, published Sep. 2, 1994.

(4) R. Toyoda, Japanese Unexamined Patent Application No. 04-356764, "Hard Disk Device", assigned to Matsushita Corporation, published Dec. 10, 1992.

(5) Lin et al., "Electrostatically Loaded Slider Bearing", *IBM Technical Disclosure Bulletin*, Vol. 12, December 1969, page 959.

In this regard, Day depicts the use of mechanical barriers with power on or off. Allen relies upon suspension bumps and data-free landing zones with power off. These minimize the shock impact on vibrating suspensions. In contrast, Maruo and Toyoda use electrostatic force on the suspension to maintain an air gap and avoid head/disk collision while the disk is rotating oblivious to shock. Lastly, Lin uses an adjustable electrostatic force between the disk and slider while the disk is rotating to maintain an air gap.

Day avoids head/disk collisions when the heads are parked in a landing zone adjacent to the hub of the disk stack. When the drive is operational, a circumferential flange of a spacer between the disks in the stack extends between the magnetic heads in a direction slightly clearing the suspensions. This permits the heads and suspension to fly above the disks on respective air bearings. When heads and suspensions are parked, the flange operates as a head lift limiter. The flange is arranged to inhibit any head travel responsive to shock parallel to the disk.

Allen embeds a plurality of hard contact raised areas in the suspension portion of each accessing assembly. The raised areas are located opposite a counterpart track or zone in which each track or zone can be either data free, contain noncritical data, or contain data covered by an error correction code (ECC) of power sufficient to reconstruct it.

Maruo discloses the use of mutually repelling electrical charges applied between a pair of electrodes on opposite surfaces of the same disk and the electrical charges applied to suspensions supporting sliders, preventing collision between the disk and the slider.

Toyoda discloses the use of a leaf suspension positioning a slider at a predetermined distance away from a disk when the disk is not rotating, and attracting the leaf spring by way of an electrostatic element closer toward the disk when the disk is rotating, thus reducing the air gap.

Lin et al. disclose the use of an readback signal sensed from the read head to maintain a constant flying height between a slider and a disk. This is accomplished by self-adjusting a voltage applied between the slider and the disk as a function of a relative magnitude feedback comparison of the signal to a reference. In this regard, the electrostatic force of attraction is balanced against the force created by the air bearing.

SUMMARY OF THE INVENTION

It is an object of this invention to devise a nonmechanical method and means integral to a high-density magnetic disk drive for resisting externally-induced shock impact in both operating and nonoperating states.

The invention prevents separation of the head and the disk by applying an electrostatically attractive voltage force between the slider/head and disk responsive to and for the duration of a sensed shock event irrespective of the operational state of a disk drive. Because the slider/disk separation is extremely small for contact disk recording as well as high-density disk recording, applying a modest voltage between the slider and the disk during a sensed shock event generates an electrostatic force sufficient to avoid slider/transducer liftoff. Avoiding liftoff likewise eliminates the rebounds and concomitant collisions between the slider and the disk.

One embodiment of the invention uses a piezoelectric crystal transducer or other shock-sensing devices and associated circuitry mounted at predetermined locations within or on the disk drive for generating a signal indication of an external shock to the system. Control circuitry responsive to the shock event signal from the sensor applies a voltage between the transducer assembly and the surface of the disk of magnitude sufficient to exert a electrostatic attractive force therebetween. The force is preferably maintained for at least the duration of the signal and should be of sufficient magnitude to prevent the slider from twisting or bouncing in a way that would result in damage. The control circuitry may conveniently include an normally open electronic switch. A capacitive path is serially formed by the transducer assembly, a voltage source, and preferably a current limiting resistance. The capacitance of the path is a function of the spacing between the transducer assembly and the disk. The spacing includes an insulating overcoat layer, such as hydrogenated carbon, on the disk and/or slider and when the disk is rotating at sufficient speed, an air bearing.

BRIEF DESCRIPTION OF THE DRAWING

FIG. 3A is a time profile of an externally imposed shock, while

DESCRIPTION OF THE PREFERRED EMBODIMENT

Figure 1:
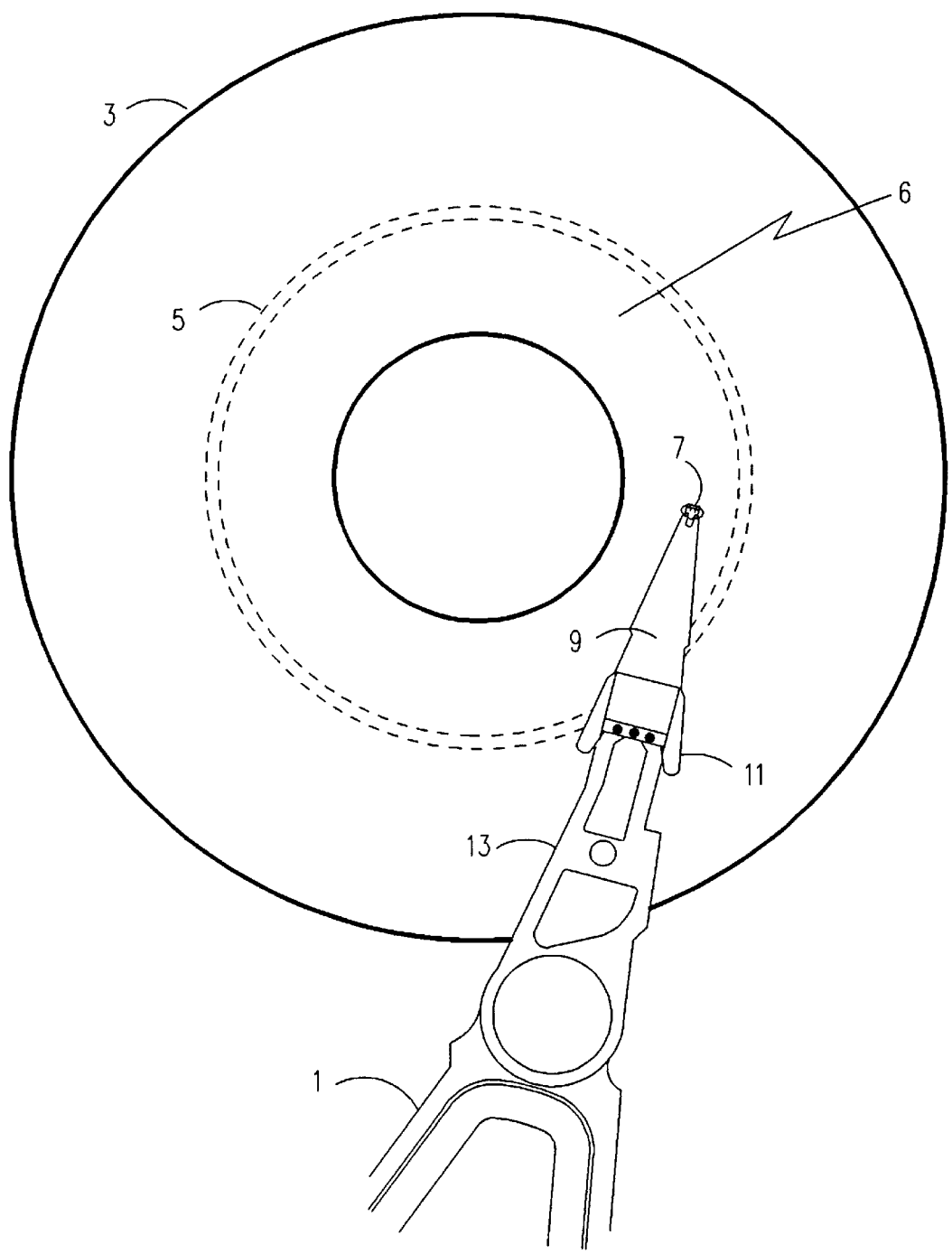
FIG. 1 shows a plan view of a head suspension assembly and a disk with a predetermined data-free track according to the prior art.

Referring now to FIG. 1, there is shown a plan view of a transducer (head) suspension assembly 1 and a disk 3 with a predetermined data-free track 5 according to the prior art. The assembly 1 includes an arm 13 driven by a voice coil motor (not shown). A transducer proper in the form of a read/write head(s) in a slider 7 tips the narrow end of a flexible triangularly-shaped suspension 9. The wide end of the suspension is secured to arm 13 by way of a rigid mount plate 11. The assembly 1 is further depicted in the "parked" position 6 on the disk 3. Parenthetically, the parked position 6 is a default or rest position in which the assemblies counterpart to disks mounted on the same spindle are placed in when the spindle motor is turned off or shut down. No user data will be stored in the parking area.

When the spindle motor is turned on, a torque is applied to the disk. As the disk ramps up to speed the slider will take off from the disk. Shorter take off times are desirable for durability.

It is clear that shock-induced disk damage may be minimized either by increasing the slider mechanical preload force or by decreasing the effective slider and suspension mass. Unfortunately, higher mechanical preload force increases the stiction and is further limited by the maximum load that an air bearing can support. It is well appreciated that common suspensions have liftoff accelerations in the range between 150–300 g acceleration where 1 g=9.81 m/s$^2$. Once a slider lifts off under shock impact, permanent disk damage may occur as previously mentioned due to the fact that the shock component forces will torque the slider and suspension plane so that eventually there will be a nonparallel planar collision with the disk.

Figure 2:
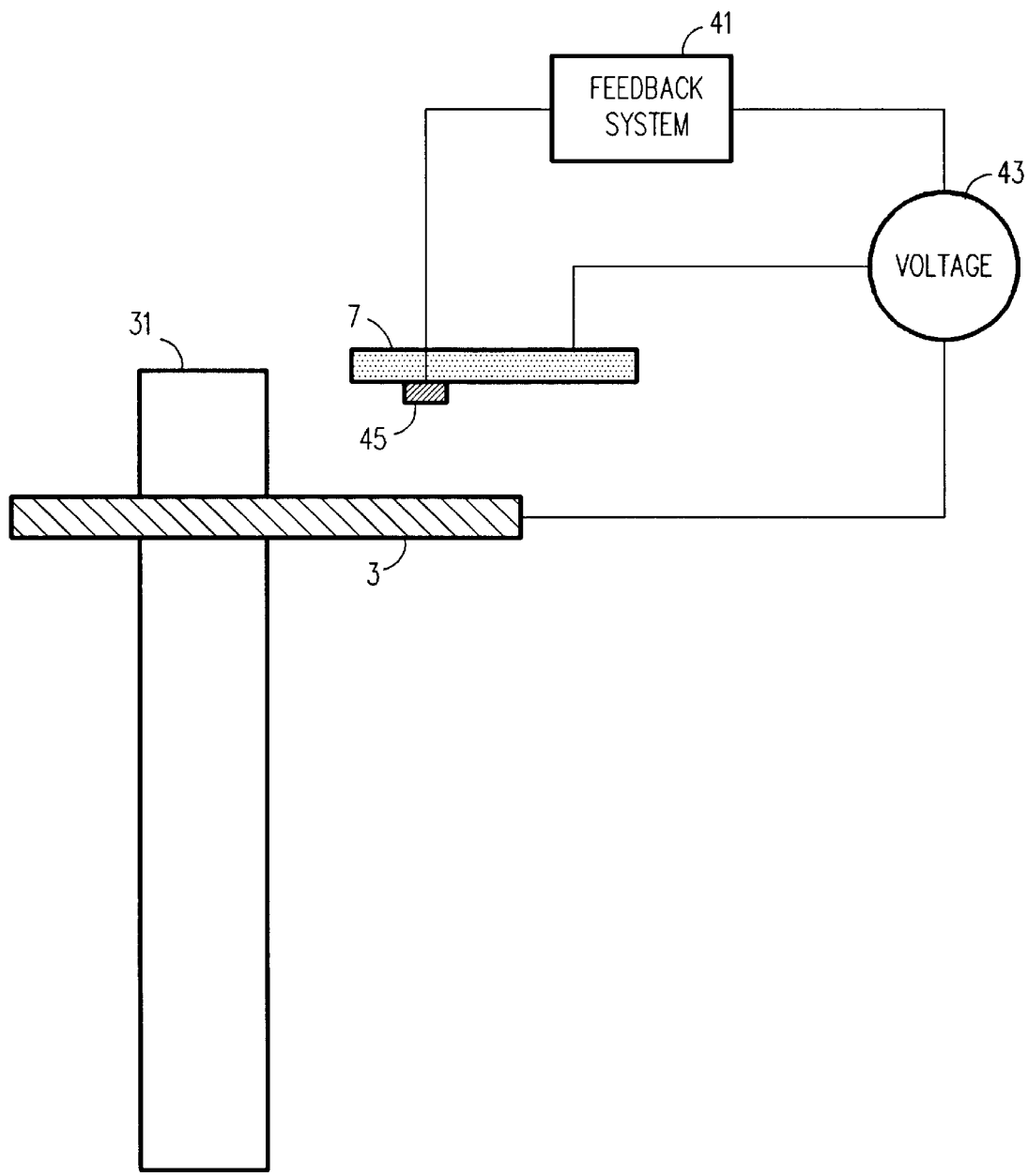
FIG. 2 depicts an electrostatically loaded slider to maintain a constant air gap according to the prior art.

Referring now to FIG. 2, there is depicted an electrostatically loaded slider to maintain a constant air gap during operation of the drive according to the prior art. A voltage source 43 is applied between the slider 7 and the rotating disk 3. This applies an attractive Coulomb force between the slider and the disk. A read head 45 senses the magnetic signal strength and applies it to a feedback system 41. Dynamically, the spindle 31 and the rotating disk 3 cause the air to move and exert an aerodynamic force on the slider of magnitude inversely proportional to the slider/disk separation. The feedback arrangement adjusts the voltage and Coulomb force, counteracting the aerodynamic force such that a constant flying height is maintained.

Figure 3A:
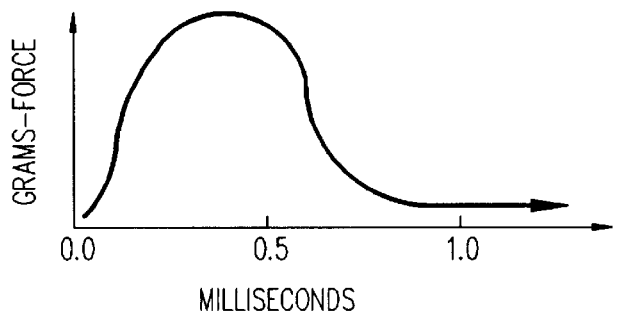

Referring now to FIG. 3A, there is shown a sample time profile of an externally imposed shock force. Shock itself is considered to be an acceleration force. It comprises an impulse and its duration typically lies in the range of 0.2–1.0 millisecond. The shock impacts the entire drive and causes vibrations or resonances in the disks, suspensions, and slider/transducer assemblies.

Figure 3B:
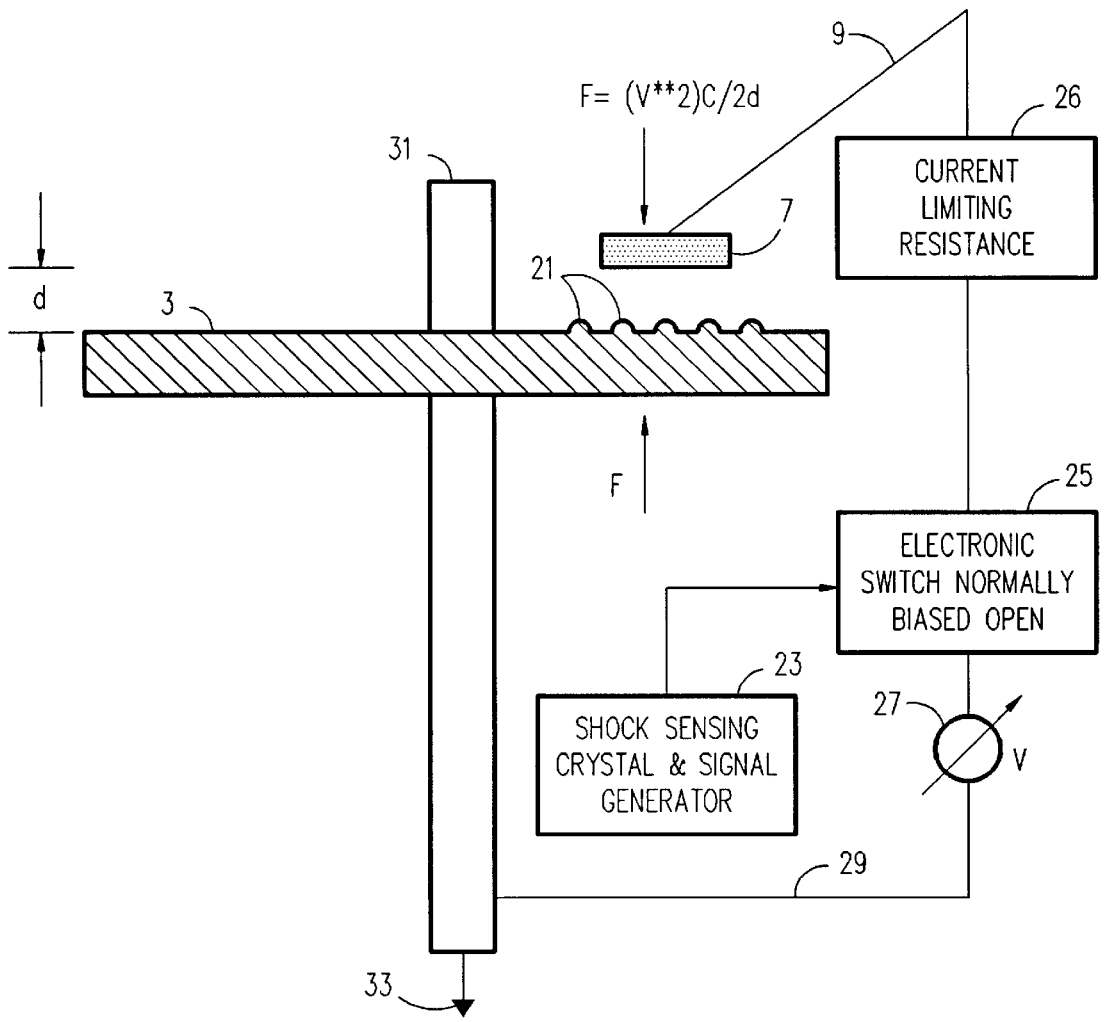
FIG. 3B shows the imposition of the electrostatic structure per the invention.

Referring now to FIG. 3B, there is shown an embodiment of the electrostatic structure per the invention. This is a type of cross-sectional view of a portion of a disk drive in which the disk 3 is rotated by spindle 31. Furthermore, the disk 3 is of the contemporary type having a "textured" surface 21 and an outer wear protection layer. A slider 7 is shown flying above the disk 3 at a height "d". The disk 3 is grounded at a designated reference point 33 through the spindle 31. A shock-sensing sensor and signal generator 23 is mounted at a predetermined location within the disk drive and drives a normally open electronic switch 25. The switch 25, when closed, forms a capacitive series circuit including the slider 7, the connecting suspension 9, a current-limiting resistor 26, a voltage source 27, a return path 29, the spindle 31, and disk 3. It follows that any shock sensed by sensor 23 above a predetermined threshold will cause switch 25 to close (turn on) to close the capacitive path and apply a voltage across the slider 7 and the disk 3. The voltage should be large enough to generate a force sufficient to hold the slider against the air bearing if the disk is rotating and against the disk if it is not rotating. When the shock has passed, there is no electric output from the sensor 23, and if no other logic has been implemented, then switch 25 returns to its normally open state, i.e. off, opening the path and removing the voltage.

Since the invention involves placing an electrostatic potential between the slider 7 and the disk 31, it is necessary to insulate the slider 7 from the disk. When the disk is not rotating and the slider 7 is parked on the disk surface, the insulation consists of the overcoat nominally layered on the disk 3. Numerous materials have been suggested and used for overcoats. Any overcoat with a sufficiently high resistance to be electrically insulating (nonconductive) can be used. When the disk is rotating, additional insulation and capacitance C is added by the effect of the air bearing. In this regard, the attractive electrostatic or Coulomb force F between the slider 7 head and disk 3 is related by the following relationship starting from the well-known inverse square law relation:

$$F=V^2\epsilon\epsilon_o A/2d^2=V^2C/2d.$$

In this formulation, the permitivity $\epsilon\epsilon_o$, the cross-sectional area A between slider 7 and the disk surface 3, and the shortest path distance d therebetween form the capacitance attribute C.

Significantly, electrostatically induced force F is used in this invention to counteract slider liftoff on shock impact. This becomes feasible since the flying heights are in the tens of nanometers range. That is, for a low and constant electrostatic potential, F varies inversely with $d^2$. Thus, when the flying heights are greater than 100 nanometers, then F is very small. However, for distances of 50 nanometers or less, the attractive force is in the gram force range for applicable voltages.

For a typical disk drive it has been found that when the voltage V applied between the slider 7 and disk 3 lies approximately in the range between 2–3 volts and the preload force on the head is of the order of 3–4 grams, the use of an additional (electrostatic) force of 3–4 grams on the head will substantially improve shock resistance. Expressed as percentage of the preload force this range is from about 75% to 133% additional force. The amount of preload is one factor determining when the slider 7 takes off from the disk 3.

Contemporary disks 3 may have textured bumps 21 of a height in the range approximating 10–30 nanometers. Thus, a slider 7 landing or parked on such a bump would have a substantial loading if a 2–3 volt potential V were applied. It further has been found that a voltage V equal to 5 volts appears to be a critical limit above which sparking may occur between the slider 7 and the disk 3. However, the placement of a current-limiting series resistor 26 avoids any damaging current peaks flowing through the switch and can control any slight breakdown to be within a few microamperes. Also, because the flying height is so small, the electrostatic force can be expressed as $F=kV^2$ where k is a proportionality constant in the range of about 0.5 grams-force/volt. If the values are substituted in the relation F=0.5 $V^2$, then for a 5-volt DC source the force=0.5×(5)$^2$= approximately 12 grams-force. The likelihood of sparking is negligible because it is not a function of an electrical avalanche effect. Indeed, the feasibility of the method arises from the low fly heights.

Referring again to FIG. 3B, it is the case that the shock sensor 23 can be formed from a piezoelectric material located in one or more predetermined locations within the disk drive. It is well known that piezoelectric crystals develop a voltage between opposite crystal faces when the crystal is subject to mechanical (shock) acceleration forces. In this regard, commercial sensor crystals formed from quartz, Rochelle salts, or ceramic crystals such as barium titanate may be used. The physical placement of the sensor 23 varies as a function of an assessment of the shock proneness of a given device. Also, more than one sensor can be used and logically combined so that a shock force component in any direction would excite at least one sensor. It should also be appreciated that commercial-grade sensor circuit arrangements include threshold logic (not shown). Thus, shocks below a predetermined gram-force magnitude would not activate the method and means of the invention. The shock event signal will normally be binary and have an active state and an inactive state. For purposes of equivalents, it should be understood that a shock sensor also can be formed from the slider and disk as plates of a capacitor and the shock can be sensed as capacitive displacement current. Use of a signal from the slider or read head to indicate shock is limited to the time when the slider is flying, i.e., the operational mode. Any type of shock sensor can be used which is sufficiently sensitive and generates a signal within a sufficiently small time after the shock occurs. Furthermore, signals inherently generated in the drive during a shock may be used in place of (or in addition to) a separate sensor if a unique correlation with shock is there. For example, if the rotary actuator moves in response to shock, electrical signals will be generated at the voice coil motor.

Referring once more to FIGS. 3A–3B, it is again noted that shock itself is considered to be an acceleration force. It comprises an impulse and typically approximates between 0.2–1.0 millisecond in duration. The method and means of this invention are to prevent the slider from initially taking off, i.e., moving erratically. Once the slider separates from the disk or air bearing, it is already too late to prevent slider/disk damage.

Advantageously, the method and means of this invention are electrically invoked and their response is preferably in the order of several nanoseconds. This arrangement does not suffer the milliseconds' delay such as would be found in mechanical systems.

Significantly, the voltage may only be applied during the shock impact time, but can be maintained for some period of time thereafter to avoid rapid cycling. It may also be advantageous to provide logic which ensures that the voltage is applied for a minimum time. Given a duration of the sensed acceleration or shock impulse of typically about 1 millisecond, the voltage should be applied for at least this period. It may, therefore, be advantageous to have a simple timer capability integrated into the control circuitry. There are two cases, namely the nonoperating shock and the shock occurring during operation. For nonoperating shocks occurring when a disk drive is in sleep mode and the disk is not spinning, the voltage should be applied for at least 2 milliseconds. In sleep mode or other reduced power state, the slider is presumably parked in a nondata area of the disk. It is again necessary to keep the voltage applied as long as the shock condition is sensed and possibly for some period of time thereafter.

If the control circuitry implementing the invention is powered from a battery, the shock protection benefits can be obtained even when the external power supply is not connected. The amount of power used by the control circuitry can be made extremely small to avoid burdening the system.

Portable and laptop PC applications are major candidates for disk drive shock protection. When a shock event occurs while a portable system is in use, there is a likelihood that the radial shock component will cause the slider and the read/write transducer to move off track. When this happens during the read mode, the data can be reread. However, when radial shock occurs during a write operation, it is necessary to avoid writing data on the wrong track or writing corrupted data. The shock event signal should, therefore, be used to inhibit any writing operation at the least. Some drives already have shock sensors which are used to inhibit writing operations. It these drives the existing shock event signal can be used to trigger the application of the electrostatic force without requiring additional sensors. Moreover, the equilibrium flying height of the slider will change when the electrostatic force is added to the normal loading force, and, therefore, normal operation of the servo system, etc. should not be expected regardless of the direction of the shock. The air bearing exerts a repulsive force between the slider and the disk proportional to 1/d in a direction opposite to the attractive electrostatic force. The equilibrium flying height is, therefore, reduced while the attractive electrostatic force is being applied.

While the invention has been described with respect to an illustrative embodiment thereof, it will be understood that various changes may be made in the method and means herein described without departing from the scope and teaching of the invention. Accordingly, the described embodiment is to be considered exemplary and the invention is not to be limited except as specified in the attached claims.

What is claimed is:

1. A method for reducing damage from an external shock applied to a disk storage device, the device having a storage disk and a transducer assembly, comprising the steps of:
    (a) sensing a signal from a shock sensor indicative of a shock event externally applied to the device; and
    (b) applying an voltage between the transducer assembly and the disk in response to sensing the signal to exert an attractive electrostatic force between the disk and the transducer assembly.

2. The method according to claim 1, further comprising the step of removing the voltage in response to the absence of the signal.

3. The method according to claim 2, wherein the step of removing the voltage further comprises the step of waiting a predetermined time after the absence of the signal has been detected.

4. The method according to claim 1, further comprising the step of inhibiting writing operations in response to sensing the signal.

5. The method according to claim 1, wherein the voltage is less than five volts.

6. The method according to claim 1, wherein the voltage is approximately from two to three volts.

7. The method according to claim 1, further comprising the steps of:
    inhibiting writing operations in response to sensing the signal; and
    removing the voltage in response to the absence of the signal for a predetermined period of time; and
    resuming normal writing operations.

8. A data storage system having a disk and a slider positionable over the disk, comprising:
    a shock sensor for generating a signal having an inactive state and active state indicating detection of an external shock;
    a voltage source supplying a voltage;
    an electronic switch for switching the voltage on and off across the slider and the disk; and
    control circuitry which turns the electronic switch on while the signal is in the active state resulting in an attractive electrostatic force between the slider and the disk.

9. The system of claim 8 further comprising means for delaying turn off of the electronic switch for a predetermined time after the signal is in the inactive state.

10. The system of claim 8 further comprising means for keeping the electronic switch on for a predetermined elapsed time even if the signal returns to the inactive state before the predetermined elapsed time expires.

11. The system of claim 8 further comprising a limiting resistor which limits electrical current which can flow through the electronic switch.

12. The system of claim 8 further comprising means for electrically grounding the disk by electrically connecting the disk to a spindle motor.

13. The system according to claim 8, wherein the attractive electrostatic force is between 75% and 133% of a preload force on the slider.

14. The system according to claim 8, wherein the shock sensor comprises a piezoelectric crystal.

15. The system according to claim 8, wherein the shock sensor uses a signal from a transducer assembly to detect a change in the flying height.

16. The system according to claim 8, wherein the disk further comprises an overcoat which is electrically insulating.

17. The system according to claim 8, wherein the voltage is approximately two to three volts.

18. The system of claim 8 wherein the shock sensor comprises a piezoelectric crystal, the system further comprising:

means for inhibiting writing while the signal is in the active state;

a limiting resistor in the electrical path of the electronic switch;

timing circuitry for delaying turn off of the electronic switch for a predetermined time after the signal is in the inactive state; and an insulating overcoat on the disk.

19. The system of claim 18 wherein the attractive electrostatic force is between 75% and 133% of a preload force on the slider.

20. A data storage system comprising:

a voltage source for generating a voltage with respect to a ground;

a spindle having an electrical connection to the ground;

a disk mounted on the spindle and electrically connected to the spindle, the disk having an electrically conductive layer or substrate and an electrically insulating overcoat;

a slider mounted on a suspension positionable over the disk by an actuator, the slider being mechanically biased toward the disk;

a shock sensor for generating a signal having an inactive state and an active state indicating an external shock exceeding a threshold is being applied to the system;

an electronic switch electrically connected between the voltage source and the slider;

a limiting resistor in the electrical path from the electronic switch to the slider; and control circuitry for closing the electronic switch in response to the signal going to the active state and for at least the approximate duration of the signal being in the active state.

\* \* \* \* \*